United States Patent
Lee et al.

(10) Patent No.: US 8,320,945 B2
(45) Date of Patent: *Nov. 27, 2012

(54) APPARATUS AND METHOD OF PERFORMING MEASUREMENTS LOGGING IN WIRELESS COMMUNICATION SYSTEM

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,136

(22) Filed: Jun. 4, 2012

(65) Prior Publication Data

US 2012/0236751 A1    Sep. 20, 2012

Related U.S. Application Data

(63) Continuation of application No. 13/082,619, filed on Apr. 8, 2011, now Pat. No. 8,219,127.

(60) Provisional application No. 61/322,907, filed on Apr. 11, 2010, provisional application No. 61/323,320, filed on Apr. 12, 2010, provisional application No. 61/329,072, filed on Apr. 28, 2010.

(51) Int. Cl.
*H04W 24/00*    (2009.01)

(52) U.S. Cl. ............ 455/466; 370/252; 709/224
(58) Field of Classification Search ............ 455/466, 455/418, 405, 67.11, 411, 458, 414.1; 370/252, 370/329, 328, 230; 709/224
See application file for complete search history.

(56) References Cited

U.S. PATENT DOCUMENTS

| 2004/0032845 | A1  | 2/2004  | Chen |
|---|---|---|---|
| 2008/0188216 | A1* | 8/2008  | Kuo et al. .......... 455/424 |
| 2009/0092045 | A1  | 4/2009  | Wu et al. |
| 2010/0273472 | A1  | 10/2010 | Drewes et al. |
| 2011/0201279 | A1* | 8/2011  | Suzuki et al. ....... 455/67.11 |

FOREIGN PATENT DOCUMENTS

| WO | WO 2010/064831 A2 | 6/2010 |
|---|---|---|
| WO | WO 2010/148290 A1 | 12/2010 |
| WO | WO 2010/151064 A2 | 12/2010 |

* cited by examiner

*Primary Examiner* — Phuoc Doan
(74) *Attorney, Agent, or Firm* — Birch, Stewart, Kolasch & Birch, LLP

(57) ABSTRACT

A method and apparatus for performing measurements logging in a mobile communications system is provided. An user equipment receives a first measurement configuration message including a first measurement configuration and receives a second measurement configuration message. The user equipment discards the first measurement configuration upon receiving the second measurement configuration message.

14 Claims, 7 Drawing Sheets

APPARATUS AND METHOD OF PERFORMING MEASUREMENTS LOGGING IN WIRELESS COMMUNICATION SYSTEM

CROSS-REFERENCE TO RELATED APPLICATIONS

The present application is a 37 C.F.R. §1.53(b) Continuation of U.S. patent application Ser. No. 13/082,619 filed on Apr. 8, 2011 now U.S. Pat. No. 8,219,127, which claims priority to U.S. Provisional applications 61/322,907 filed on Apr. 11, 2010, 61/323,320 filed on Apr. 12, 2010, and 61/329,072 filed on Apr. 28, 2010, the entire contents of all which are hereby incorporated by reference and for which priority is claimed under 35 U.S.C. §120.

BACKGROUND OF THE INVENTION

1. Field of the Invention

The present invention relates to wireless communications, and more particularly, to a method and apparatus for performing measurements logging in a wireless communication system.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Minimization of driving tests (MDT) is a test performed by service providers for coverage optimization by using a user equipment (UE) instead of using an automobile. A coverage varies depending on a location of a base station (BS), deployment of buildings nearby, a user's usage environment, etc. Therefore, it is required for the service providers to periodically perform the driving test, and a lot of costs and resources are consumed. The MDT is used when the service provider measures the coverage by using the UE.

In the conventional technique, an MDT configuration transmitted to the UE in one cell is not reported to a neighbor cell. Therefore, if the UE moves to the neighbor cell, a new MDT configuration is possibly received from the neighbor cell. Since the UE can apply only one MDT configuration at one time, one of the MDT configuration of the old cell and the new MDT configuration is discarded.

A specific MDT configuration to be applied to the UE and a way of handling an MDT measurement result based on the old MDT configuration have not been provided for a case where a plurality of MDT configurations exist

SUMMARY OF THE INVENTION

In an aspect, a user equipment (UE) configured to perform measurements logging in a mobile communications system is provided. The UE includes a transceiver configured to transmit and receive data, and a controller operatively connected to the transceiver and configured to receive a first measurement configuration message including a first measurement configuration, receive a second measurement configuration message, and discard the first measurement configuration upon receiving the second measurement configuration message.

The controller may be configured to discard a measurement log upon receiving the second measurement configuration message.

The controller may be configured to log a measurement using the first measurement configuration in the first measurement configuration message.

The controller may further be configured to store the first measurement configuration in the first measurement configuration message, and perform a first measurement logging using the first measurement configuration in the first measurement configuration message.

The controller may further be configured to perform a second measurement logging using the second measurement configuration in the second measurement configuration message.

The first measurement configuration may include at least one of a logging interval indicating a periodicity for storing a measurement result, a reference time indicating when to send a logged measurement report, and an area configuration indicating an area for performing measurement logging.

The second measurement configuration message may include a second measurement configuration, and the controller may further be configured to store the second measurement configuration.

The second measurement configuration may include at least one of a logging interval indicating a periodicity for storing a measurement result, a reference time indicating when to send a logged measurement report, and an area configuration indicating an area for performing measurement logging.

The measurement may be logged in a radio resource control (RRC) idle mode.

The controller may be configured to receive the first measurement configuration message in a first radio resource control (RRC) connected mode and receive the second measurement configuration message in a second RRC connected mode, the first RRC connected mode may correspond to a RRC connection between the UE and a first cell of the mobile communications system, and the second RRC connected mode may correspond to a RRC connection between the UE and a second cell of the mobile communications system.

In another aspect, a method for performing measurements logging by a user equipment (UE) in a mobile communications system is provided. The method includes receiving, by the UE, a first measurement configuration message including a first measurement configuration, receiving, by the UE, a second measurement configuration message, and discarding, by the UE, the first measurement configuration upon receiving the second measurement configuration message.

DESCRIPTION OF EXEMPLARY EMBODIMENTS

Figure 1:
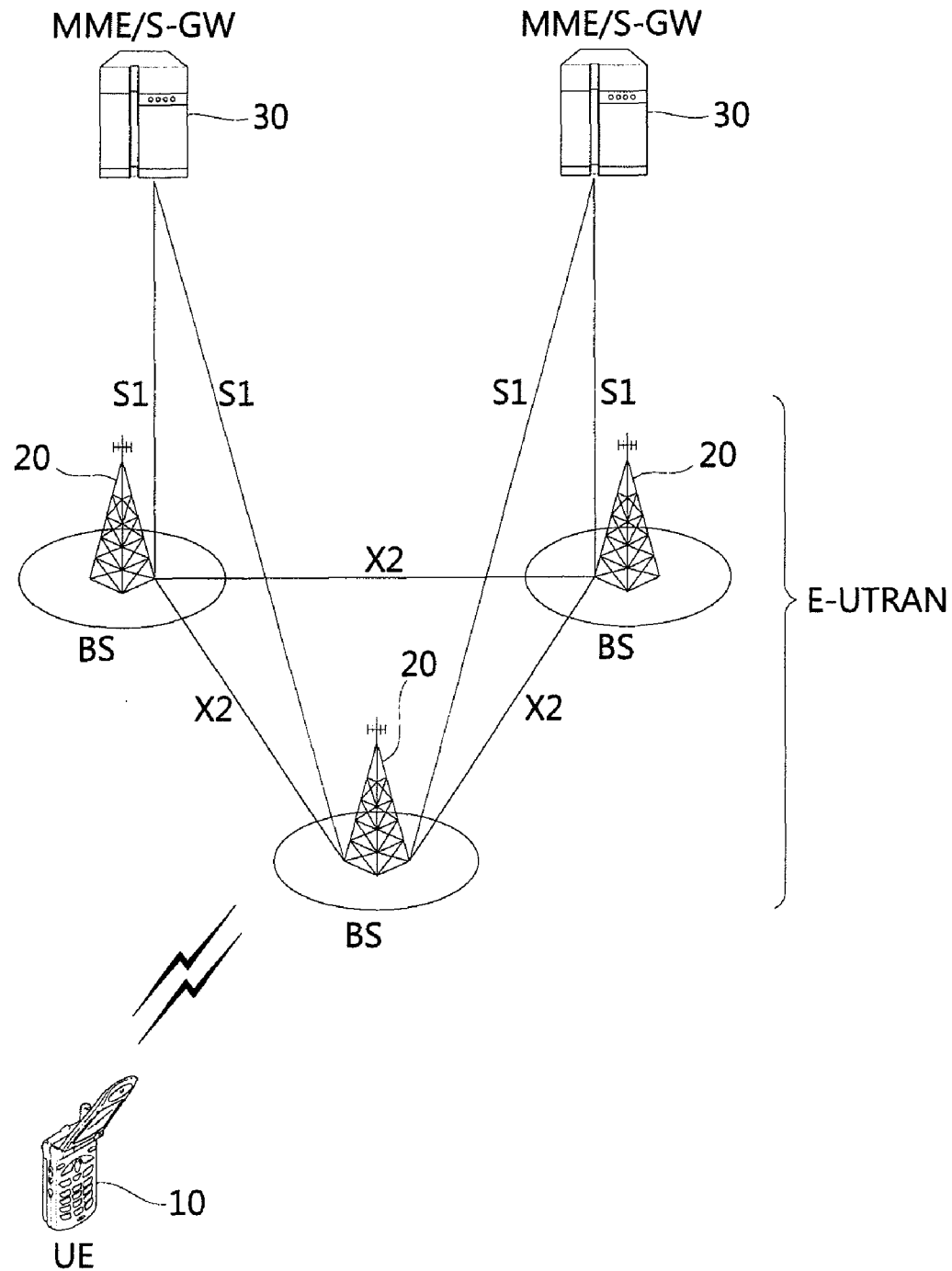
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
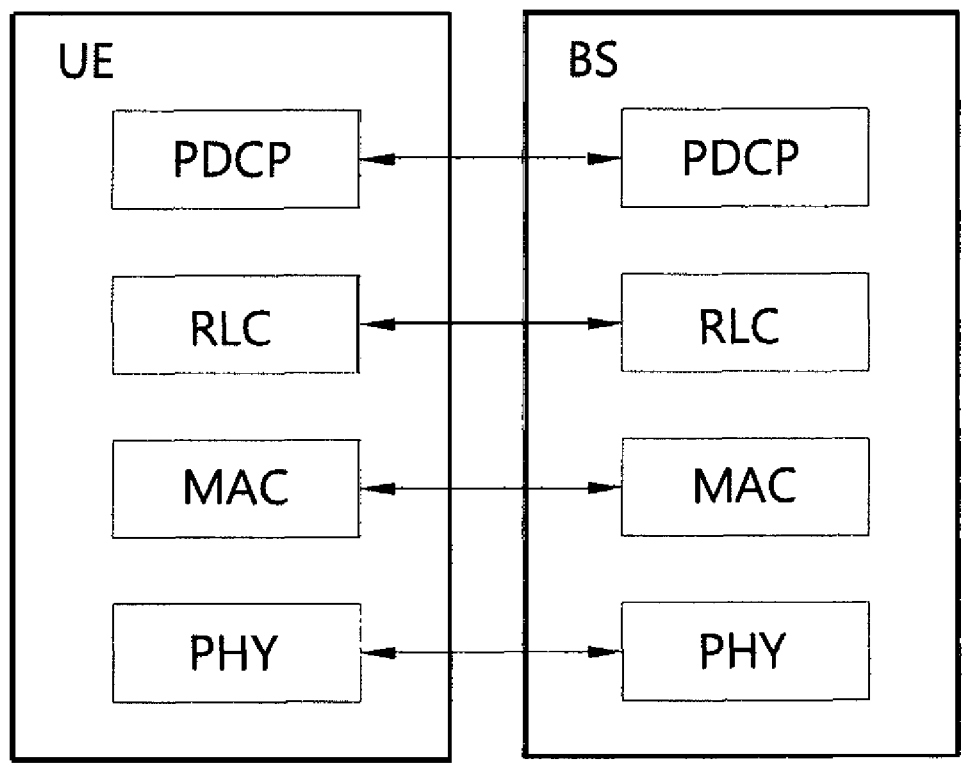
FIG. 2 is a diagram showing a radio protocol architecture for a user plane.
Figure 3:
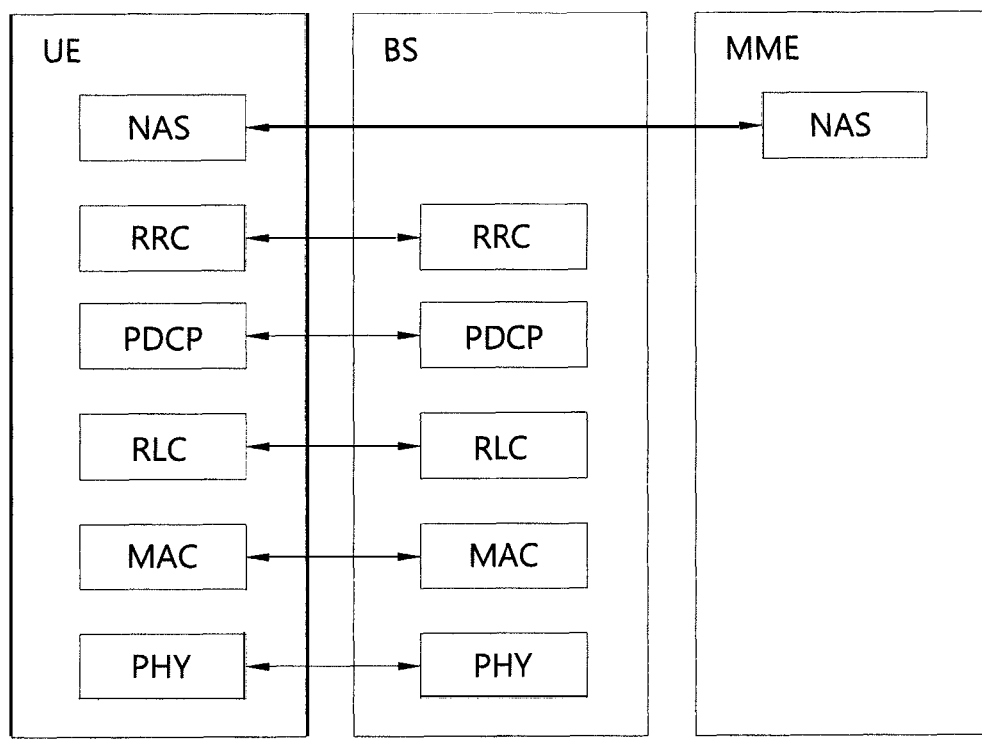
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (or may be called as an RRC connected mode), and otherwise the UE is in an RRC idle state (or may be called as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be described.

The system information includes essential information that must be known to a UE to access a BS. Thus, the UE has to receive all of the system information before accessing the BS. Further, the UE must always have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a particular cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.
2) Normal service: This service denotes a public use service for general use, and can be provided in a suitable or normal cell.
3) Operator service: This service denotes a service for a network service provider, and a cell can be used only by the network service provider and cannot be used by a normal user.

The service type provided by a cell can be classified as follows.

1) Acceptable cell: This cell serves a UE with a limited service. This cell is not barred from the perspective of the UE, and satisfies a cell selection criterion of the UE.
2) Suitable cell: This cell serves a UE with a regular service. This cell satisfies a condition of the acceptable cell, and also satisfies additional conditions. Regarding the additional conditions, this cell has to belong to a PLMN to which the UE can access, and a tracking area update procedure of the UE must not be barred in this cell. If the corresponding cell is a CSG cell, this cell must be accessible by the UE as a CSG member.
3) Barred cell: Information indicating that a cell is a barred cell is broadcast in this cell by using the system information.
4) Reserved cell: Information indicating that a cell is a reserved cell is broadcast in this cell by using the system information.

Next, a procedure for measurements will be described in detail.

It is necessary for a wireless communication system to support mobility of a UE. Therefore, the UE persistently measures quality of a serving cell providing a current service and quality of a neighbor cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (e.g., a global cell identity) of the specific cell, location identification information indicating a location of the specific cell (e.g., a tracking area code), and/or other cell information (e.g., whether it is a member of a closed subscriber group (CSG) cell).

While moving, if the UE determines that quality of a specific region is significantly poor, the UE may report a measurement result and location information on the poor cell to the network. The network may attempt to optimize the network on the basis of the measurement result reported from UEs which assist the network operation.

In a wireless communication system having a frequency reuse factor of 1, mobility is generally supported between different cells existing in the same frequency band. Therefore, in order to properly guarantee the UE mobility, the UE has to properly measure cell information and quality of neighbor cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

Service providers may operate networks by using a plurality of frequency bands. If a service of a communication system is provided by using the plurality of frequency bands, optimal mobility can be guaranteed to the UE when the UE is able to properly measure cell information and quality of neighbor cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Hereinafter, by referring to the 3GPP TS 36.304 V8.3.0 (2008-09) "User Equipment (UE) procedures in idle mode (Release 8)", a method and procedure for selecting a cell by a UE will be described in detail.

After a UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called cell reselection. A basic object of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority in the first place than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

a. Intra-frequency cell reselection: A reselected cell is a cell having the same center-frequency and the same RAT as those used in a cell on which the UE is currently being camped.

b. Inter-frequency cell reselection: A reselected cell is a cell having the same RAT and a different center-frequency with respect to those used in the cell on which the UE is currently being camped.

c. Inter-RAT cell reselection: A reselected cell is a cell using a different RAT from a RAT used in the cell on which the UE is currently being camped.

The principles of the cell reselection process are as follows.

First, A UE receives from a BS parameters for cell reselection.

Second, the UE measures quality of a serving cell and a neighboring cell for cell reselection.

Third, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g., cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 as shown:

$$Rs = Q\text{meas},s + Q\text{hyst}, Rn = Q\text{meas},n - Q\text{offset} \qquad \text{[Equation 1]}$$

where Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranging criterion Rn of the neighboring cell are not much different from each other and constantly vary, ranking orders of the serving cell and the neighboring cell may change frequently. Thus, the serving cell and the neighboring cell may be reselected alternately while changing their ranking orders too often. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as most important factor when performing the cell reselection. If a reselected cell is not a suitable cell, the UE excludes the reselected cell or a frequency of the reselected cell from targets of the cell reselection.

Figure 4:
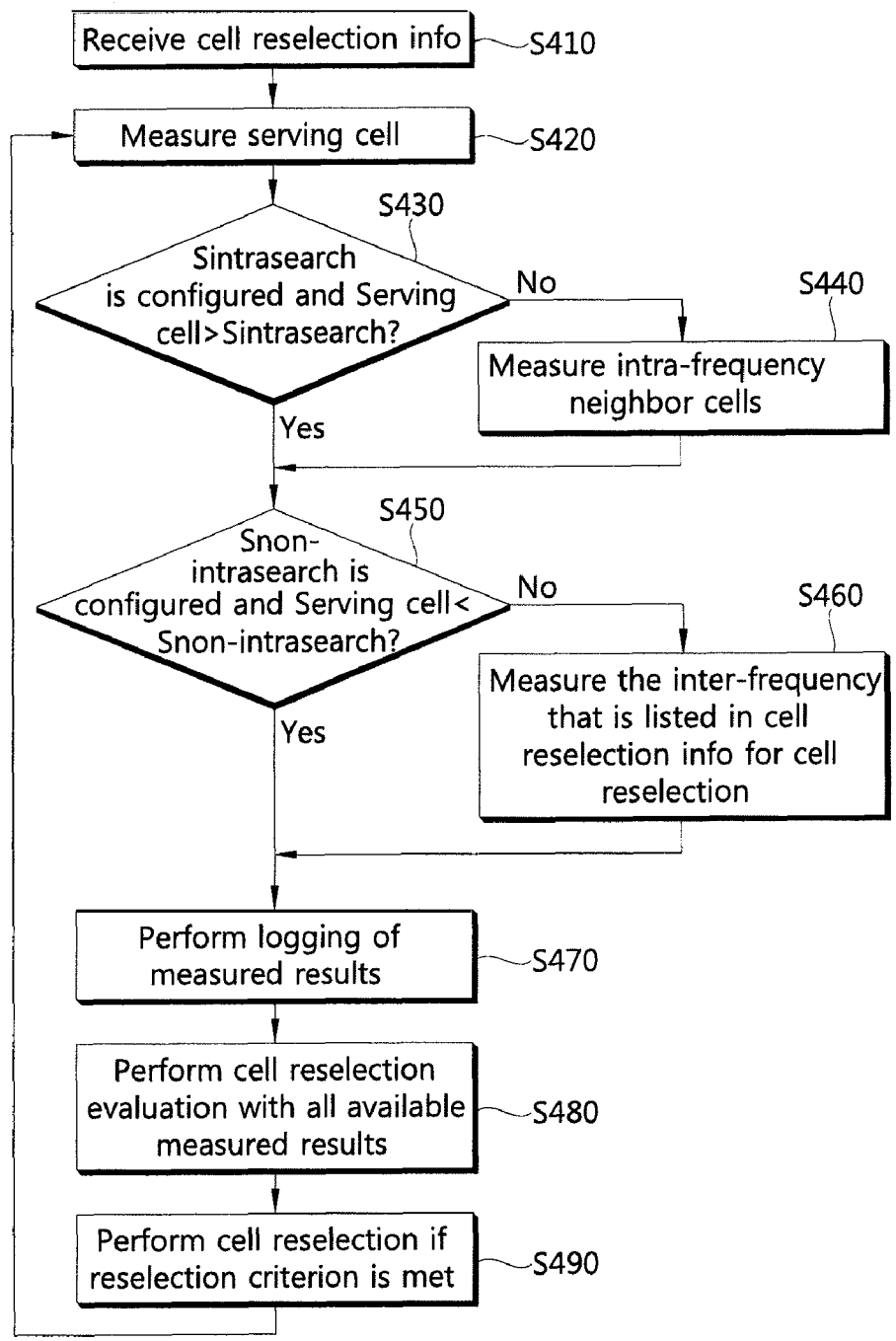
FIG. 4 is a flowchart showing a measurement method of a UE.

FIG. 4 is a flowchart showing a measurement method of a UE.

The UE measure neighbor cells in order to know whether there is a neighbor cell better than a serving cell and to access to the cell if such a neighbor cell exists. However, when the neighbor cells are measured persistently, it may cause power consumption of the UE. Therefore, if the serving cell has sufficiently good quality, measurement on the neighbor cells is skipped if possible so as to reduce power consumption of the UE.

The UE receives cell reselection information from a BS (step S410). The cell reselection information may include two thresholds, i.e., Sintrasearch and Snon-intrasearch.

The UE measures the serving cell (step S420). A measurement result of the serving cell is denoted by Sserve.

The UE compares Sserve and Sintrasearch (step S430). If Sserve is less than Sintrasearch, the UE performs intra-frequency measurement (step S440). Otherwise, if Sserve is greater than Sintrasearch, the UE can skip measurement on neighbor cells having the same frequency as the serving cell.

If the cell reselection information does not include Sintrasearch, the UE cannot skip the measurement on the neighbor cells having the same frequency as the serving cell.

The UE compares Sserve and Snon-intrasearch (step S450). If Sserve is greater than Snon-intrasearch, the UE performs inter-frequency measurement (step S460). That is, if the serving cell has better quality than Snon-intrasearch, the UE can skip measurement on neighbor cells having a different frequency from the serving cell.

If the cell reselection information does not include Snon-intrasearch, the UE cannot skip the measurement on the neighbor cells having a different frequency from the serving cell.

The UE logs the measurement result (step S470). The UE performs cell reselection evaluation with all available measurement results (step S480). If a reselection criterion is met, the UE performs cell reselection (step S490).

Now, minimization of driving tests (MDT) will be described.

The MDT is a test performed by service providers for coverage optimization by using a UE instead of using an automobile. A coverage varies depending on a location of a BS, deployment of buildings nearby, a user's usage environment, etc. Therefore, it is required for the service providers to periodically perform driving tests, and a lot of costs and resources are consumed. The MDT is used when the service provider measures the coverage by using the UE.

The MDT can be classified into a logged MDT and an immediate MDT. According to the logged MDT, after performing the MDT measurement, the UE delivers a logged measurement to a network available at a time of satisfying a reporting condition. According to the immediate MDT, after performing the MDT measurement, the UE delivers the measurement to the network at points in time when a configured reporting condition is satisfied. The logged MDT performs the MDT measurement in an RRC idle mode, but the immediate MDT performs the MDT measurement in an RRC connected mode.

Figure 5:
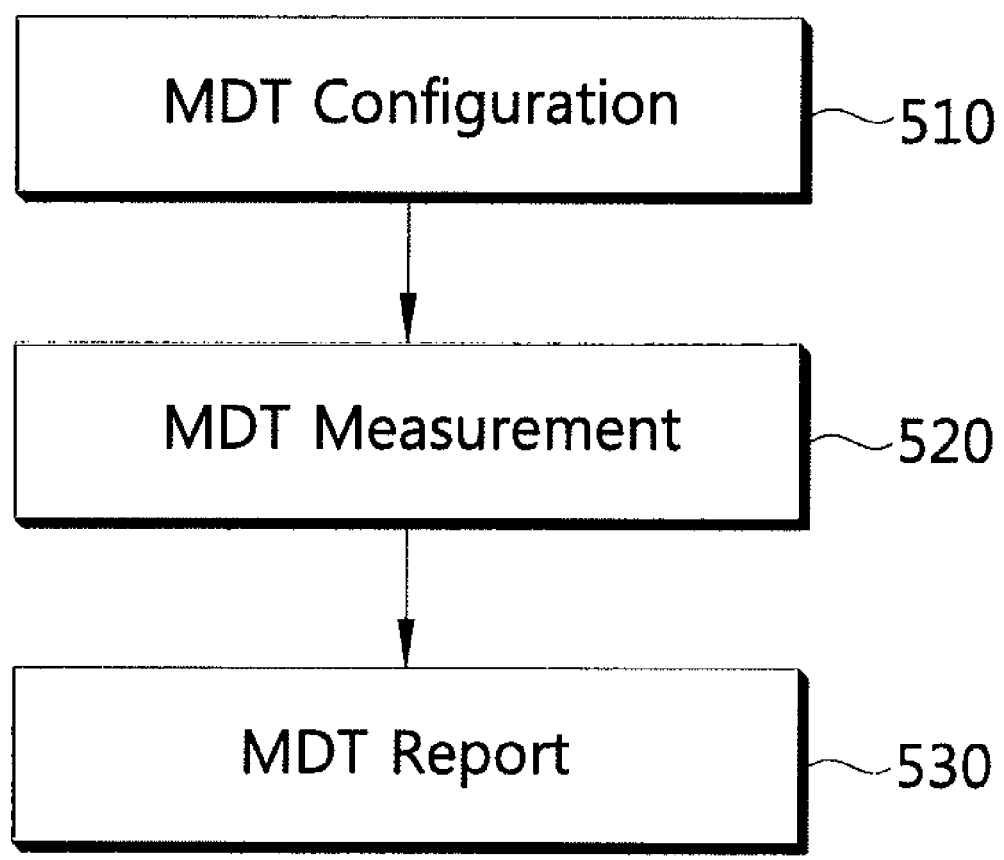
FIG. 5 shows a procedure of performing MDT.

FIG. 5 shows a procedure of performing MDT.

The MDT includes an MDT configuration 510, an MDT measurement 520, and an MDT report 530 which are performed in that order.

The MDT configuration can be transmitted from a network to a UE via a logged measurement configuration message which is an RRC message. The UE can receive the MDT configuration in an RRC connected mode. Even if the UE transitions to an RRC idle mode, the MDT configuration is kept, and thus an MDT measurement result is also kept.

The MDT configuration may include at least one of a logging interval, a reference time, and an area configuration. The logging interval indicates a periodicity for storing a measurement result. The reference time is used by the UE to echo back the reference in a logged measurement report. The area configuration indicates an area for which the UE is requested to perform logging.

The UE performs the MDT measurement based on the MDT configuration. For example, the MDT measurement is performed at every logging interval.

A measurement value may be a value well-known to those ordinary skilled in the art, such as reference signal received power (RSRP), reference signal received quality (RSRQ), received signal code power (RSCP), and Ec/No.

The UE sends to the network a logged measurement in the RRC connected mode. In the logged MDT, the UE logs the measurement in the RRC idle mode. Then, upon re-entering the RRC connected mode, the UE sends the logged measurement to the network.

The logged measurement may include at least one of measurement results of available serving cell measurements, measurement results of available neighbor cell measurements, time information, and location information.

In the conventional technique, an MDT configuration transmitted to the UE in one cell is not reported to a neighbor cell. Therefore, if the UE moves to the neighbor cell, a new MDT configuration is possibly received from the neighbor cell. Since the UE can apply only one MDT configuration at one time, one of the MDT configuration of the old cell and the new MDT configuration is discarded.

A specific MDT configuration to be applied to the UE and a way of handling an MDT measurement result based on the old MDT configuration have not been provided for a case where a plurality of MDT configurations exist. In addition, the network also does not know the specific MDT configuration to be applied to the UE and the way of handling the MDT measurement.

According to the proposed invention, a problem that occurs when the network transmits two or more configuration messages redundantly to the UE can be solved.

The UE receives a first configuration from the network, and performs logging of data according to the first configuration in an idle mode. Upon receiving a second configuration, the UE may discard the logged data.

The idle mode may be an RRC idle mode which does not have an RRC connection between the UE and the network.

The first and second configurations may be included in an RRC message that configures data collection.

The first and second configurations may be an MDT configuration for an MDT measurement.

The logged data may include an MDT measurement result.

The UE may receive the first and second configurations in an RRC connection mode.

The data may include data obtained by measuring quality of cells provided by the network.

If the network requests a report of the data before receiving the second configuration, the UE may transmit the logged data to the network.

If the logged data exists, the UE may report the presence of the logged data to the network when transition occurs from the RRC idle mode to the RRC connection mode.

If the logged data exists, the UE in the RRC connection mode may report the presence of the logged data to the network whenever it moves to another cell.

Figure 6:
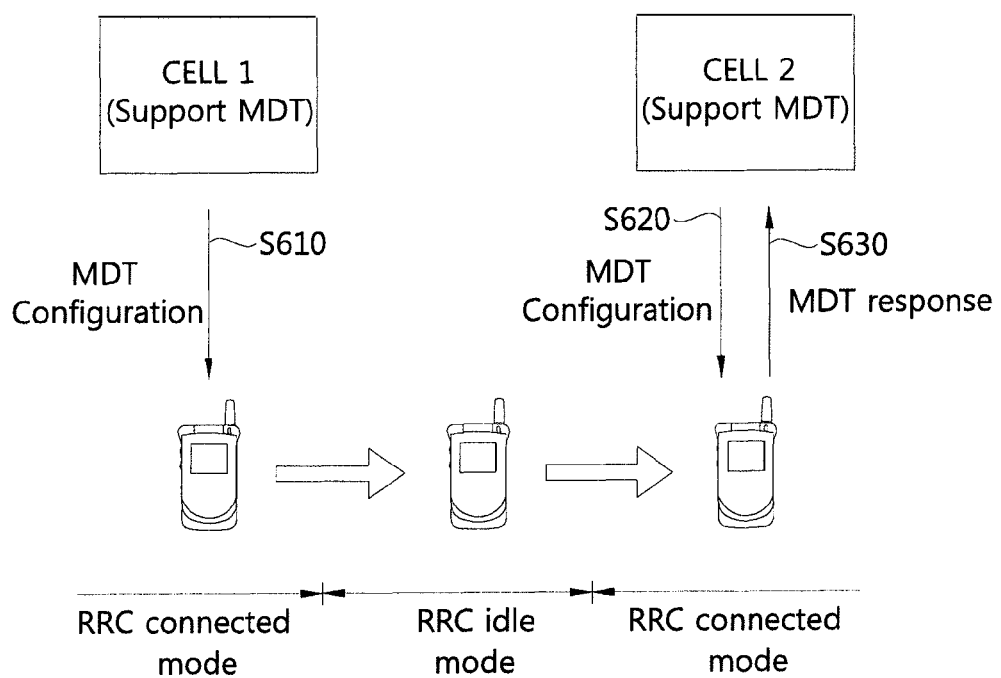
FIG. 6 shows an MDT configuration procedure according to an embodiment of the present invention.

FIG. 6 shows an MDT configuration procedure according to an embodiment of the present invention.

A UE in an RRC connection mode receives an MDT configuration from a cell 1 (step S610). The MDT configuration includes information indicating data, a region at which the data is collected, a time period in which the data is collected, and a way of collecting the data by the UE. The UE stores the MDT configuration.

The UE releases an RRC connection with a network, and enters an RRC idle mode. In the RRC idle mode, the UE performs measurement according to the stored MDT configuration, and logs the measurement result. A measurement value to be logged includes a measurement value on cell quality such as RSRP, RSRQ, etc.

The UE re-establishes the RRC connection with the network and enters the RRC connection mode. In the RRC connection mode, the UE receives a new MDT configuration from a cell 2 (step S620).

Upon receiving the new MDT configuration, the UE may discard the previous MDT configuration and then configure MDT according to the new MDT configuration. The logged MDT measurement value may be discarded according to the previous MDT configuration.

Alternatively, the UE may ignore or reject the new MDT configuration, and may maintain the previous MDT configuration.

Upon receiving the new MDT configuration, the UE may transmit an MDT response to the network (step S630).

The MDT response may include an MDT measurement result which is currently stored. In this case, the MDT measurement result is not discarded in the previous process.

The MDT response may include an indicator indicating the presence of the MDT measurement result which is currently stored. In this case, the MDT measurement result is not discarded in the previous process.

The MDT response may include an indicator indicating the presence of the previous MDT configuration. In this case, the MDT configuration is not discarded in the previous process.

Meanwhile, if the previous MDT configuration is not discarded in the previous process and if the received indicator indicates the presence of the previous MDT configuration, the cell 2 may discard the previous MDT configuration or transmit to the UE an MDT discard indicating that the new MDT configuration is discarded. The UE may discard the previous MDT configuration or the new MDT configuration according to the MDT discard.

The MDT measurement can be more correctly performed by defining an operation of the UE when receiving a plurality of MDT configurations.

Figure 7:
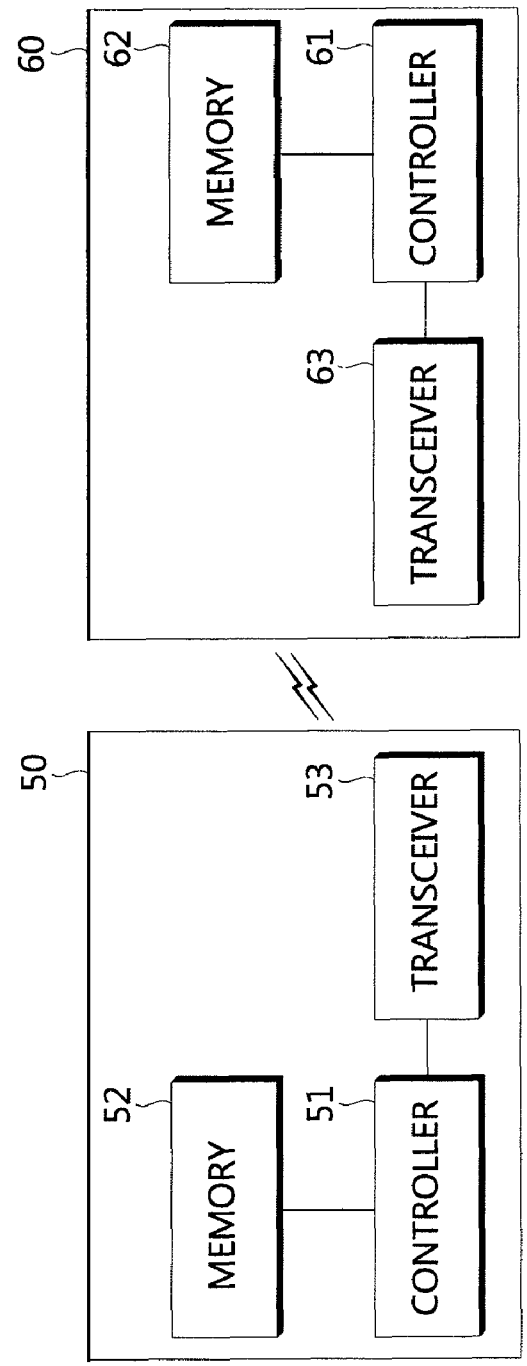
FIG. 7 is a block diagram showing a wireless communication system for implementing an embodiment of the present invention.

FIG. 7 is a block diagram showing a wireless communication system for implementing an embodiment of the present invention.

A BS 50 includes a controller 51, a memory 52, and a transceiver 53. The memory 52 is coupled to the controller 51, and stores a variety of information for driving the processor 51. The RF unit 53 is coupled to the controller 51, and transmits and/or receives data.

The controller 51 implements the proposed functions, processes and/or methods. The controller 51 may perform MDT measurement according to the embodiments of FIG. 6 or combinations thereof.

A UE 60 includes a controller 61, a memory 62, and a transceiver 63. The memory 62 is coupled to the controller 61, and stores a variety of information for driving the controller 61. The RF unit 63 is coupled to the controller 61, and transmits and/or receives a radio signal.

The controller 61 implements the proposed functions, processes and/or methods. The controller 61 may perform MDT measurement according to the embodiments of FIG. 6 or combinations thereof.

A controller may be implemented by a processor. The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A user equipment (UE) configured to discard a measurement configuration in a mobile communications system, comprising:
   a transceiver configured to transmit and receive data; and
   a controller operatively connected to the transceiver and configured to:
      receive a first measurement configuration message including a first measurement configuration,
      receive a second measurement configuration message including a second measurement configuration, and
      discard the first measurement configuration upon receiving the second measurement configuration message,
   wherein the first measurement configuration and the second measurement configuration are for Minimization of Drive Tests (MDT).

2. The UE of claim 1, wherein the controller is further configured to log a first measurement using the first measurement configuration in the first measurement configuration message.

3. The UE of claim 2, wherein the controller is further configured to discard the logged first measurement upon receiving the second measurement configuration message.

4. The UE of claim 3, wherein the controller is further configured to log a second measurement using the second measurement configuration in the second measurement configuration message.

5. The UE of claim 4, wherein the controller is further configured to store the logged second measurement configuration in the second measurement configuration message.

6. The UE of claim 1, wherein the controller is further configured to store the first measurement configuration in the first measurement configuration message.

7. The UE of claim 1,
wherein the controller is configured to receive the first measurement configuration message in a first radio resource control (RRC) connected mode and receive the second measurement configuration message in a second RRC connected mode,
wherein the first RRC connected mode corresponds to a RRC connection between the UE and a first cell of the mobile communications system, and
wherein the second RRC connected mode corresponds to a RRC connection between the UE and a second cell of the mobile communications system.

8. A method for discarding a measurement configuration by a user equipment (UE) in a mobile communications system, the method comprising:
receiving, by the UE, a first measurement configuration message including a first measurement configuration;
receiving, by the UE, a second measurement configuration message including a second measurement configuration; and
discarding, by the UE, the first measurement configuration upon receiving the second measurement configuration message,
wherein the first measurement configuration and the second measurement configuration are for Minimization of Drive Tests (MDT).

9. The method of claim 8, further comprising:
logging a first measurement using the first measurement configuration in the first measurement configuration message.

10. The method of claim 9, further comprising:
discarding the logged first measurement upon receiving the second measurement configuration message.

11. The method of claim 8, further comprising:
storing the first measurement configuration in the first measurement configuration message.

12. The method of claim 10, further comprising:
logging a second measurement using the second measurement configuration in the second measurement configuration message.

13. The method of claim 12, further comprising:
storing the logged second measurement configuration in the second measurement configuration message.

14. The method of claim 8,
wherein the first measurement configuration message is received in a first radio resource control (RRC) connected mode and the second measurement configuration message is received in a second RRC connected mode,
wherein the first RRC connected mode corresponds to a RRC connection between the UE and a first cell of the mobile communications system, and
wherein the second RRC connected mode corresponds to a RRC connection between the UE and a second cell of the mobile communications system.

* * * * *